(12) United States Patent
Rae

(10) Patent No.: US 6,388,849 B1
(45) Date of Patent: May 14, 2002

(54) ARC FAULT DETECTOR RESPONSIVE TO AVERAGE INSTANTANEOUS CURRENT AND STEP INCREASES IN CURRENT AND CIRCUIT BREAKER INCORPORATING SAME

(75) Inventor: Thomas Christopher Rae, Irwin, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/504,002

(22) Filed: Feb. 14, 2000

(51) Int. Cl.$^7$ ................................................ H02H 9/08
(52) U.S. Cl. ............................................................ 361/42
(58) Field of Search ............................................ 361/42

(56) References Cited

U.S. PATENT DOCUMENTS

| | | | |
|---|---|---|---|
| 5,224,006 A | 6/1993 | MacKenzie et al. | 361/45 |
| 5,519,561 A | 5/1996 | Mrenna et al. | 361/5 |
| 5,682,101 A | 10/1997 | Brooks et al. | 324/536 |
| 5,691,869 A | * 11/1997 | Engel et al. | 361/42 |
| 5,805,397 A | 9/1998 | MacKenzie | 361/42 |
| 5,815,352 A | 9/1998 | MacKenzie | 361/42 |
| 5,818,237 A | 10/1998 | Zuercher et al. | 324/536 |
| 5,896,262 A | 4/1999 | Rae et al. | 361/94 |
| 5,933,305 A | 8/1999 | Schmalz et al. | 361/42 |
| 6,088,205 A | * 7/2000 | Neiger et al. | 361/42 |
| 6,128,169 A | * 10/2000 | Neiger et al. | 361/42 |
| 6,232,857 B1 | * 5/2001 | Mason, Jr. et al. | 361/42 |

* cited by examiner

*Primary Examiner*—Adolf Deneke Berhane
*Assistant Examiner*—Pia Tibbits
(74) *Attorney, Agent, or Firm*—Martin J. Moran

(57) ABSTRACT

An arc fault detector includes an average instantaneous current generator which averages the current over the fundamental period and produces a substantial output only where there are substantial variations in waveform between half-cycles which is indicative of an arc. To discriminate over inrush currents, a pulse generator generates a pulse in response to the step increase in current caused by striking of an arc. An output circuit generates an arc signal when the time attenuated accumulation of pulses occurring in half-cycles in which the average instantaneous current is above a selected threshold reaches a predetemiined level. To further discriminate over dimmers during turn on of a cold tungsten bulb, die ANDing with the average instantaneous current is delayed until a time attenuated accumulation of the pulses reaches a threshold value. The average instantaneous current can be approximated by a bandpass filter with a center frequency below the fundamental of the ac current. A second bandpass filter with a center frequency above the fundamental can be used as the pulse generator.

21 Claims, 4 Drawing Sheets

ARC FAULT DETECTOR RESPONSIVE TO AVERAGE INSTANTANEOUS CURRENT AND STEP INCREASES IN CURRENT AND CIRCUIT BREAKER INCORPORATING SAME

BACKGROUND OF THE INVENTION

1. Field of the Invention

This invention relates to detection and interruption of currents in an AC electrical power circuit experiencing arcing faults. More particularly, it relates to apparatus with increased sensitivity to difficult to distinguish arcs, such as carbon arcs, yet with enhanced immunity to nuisance tripping.

2. Background Information

Arc faults can occur in electrical systems, for instance between adjacent paired conductors, between exposed ends of broken conductors, at a faulty connection, where carbon deposits have collected adjacent terminals or outlets, and in other situations where conducting elements are in close proximity. Arc faults in AC systems can be intermittent; however, arcs caused by carbon deposits can occur regularly in successive half-cycles.

Arc faults typically have high resistance, so that the arc current is below the instantaneous or magnetic trip threshold of conventional circuit breakers. Also, the intermittent nature of an arc fault can create an average RMS current value which is below the thermal threshold for such circuit breakers. Even so, the arcs can cause damage or start a fire if they occur near combustible materials. It is not practical to simply lower the pick-up currents on conventional circuit breakers, as there are many typical loads which draw similar currents and which would, therefore, cause nuisance trips.

Much attention has been directed to trying to distinguish arcing currents from other intermittent currents. It has been recognized that arcing faults generate a great deal of high frequency noise, and flirter, that there are periods of quiescence in the high frequency component. Some circuit breakers look to such features to differentiate arcing faults from other phenomena. Circuit breakers which rely upon such detailed characteristics of current waveform to detect arc faults typically utilize a microprocessor to perform the analysis. They also require fairly good quality analog-to-digital converters to capture the high frequencies of interest. Thus, such arc fault detectors add significantly to the cost of a circuit breaker, and in die case of the typical residential circuit breaker, can multiply its cost many times. Yet even such sophisticated circuit breakers are subject to nuisance trips when confronted with some common load devices.

It has also been recognized that arc faults generate a step increase in current when the arc is struck. However, many typical loads generate a similar step increase when a device is turned on. In many cases, the step increase produced by a load is a singular event and can be distinguished from an arc fault which generates repetitive step increases by counting step increases during an interval such as a few half-cycles. A more sophisticated variant of this type of arc fault detector maintains a time attenuated accumulation of step increases and generates a trip when a selected level of the accumulation is reached. This type of detector provides a faster trip on large step increases while reducing nuisance trips.

A dimmer circuit provides unique problems for an arc fault detector which responds to the step increases generated by the striking of an arc. A dimmer, when phased back, produces a pattern of step increases in current each half-cycle. Under steady state conditions, the amplitude of these pulses will be below that of an arc current, and can, therefore, be distinguished on that basis. However, if the dimmer is used to control a tungsten bulb, the cold filament has a very low resistance on start-up which produces a large initial pulse with subsequent pulses decaying in amplitude as the filament rapidly warms up. This characteristic of a dimmer has also been used to distinguish it from arc faults, but it still has been necessary to maintain die threshold for arc detection above the handle rating to avoid nuisance tripping on a dimmer.

As mentioned, carbon arc faults can strike in successive half-cycles and thus look very similar to a dimmer. This presents a difficult challenge in meeting the code requirement for a reliable response to carbon arcs within eight half-cycles of onset while rejecting nuisance trips in response to a dimmer including turn on of a cold tungsten bulb.

It is an object of the invention, therefore, to provide an improved arc fault detector and circuit breaker incorporating the same which has increased sensitivity to arc faults, while also having enhanced immunity to nuisance trips.

It is a particular object of the invention to provide such apparatus which responds reliably to carbon arcs while rejecting trips attributable to dimmers and especially dimmers controlling tungsten bulbs.

It is another object of the invention to increase the sensitivity of an arc fault detector which responds to step increases in current caused by the striking of an arc.

It is another object of the invention to provide such apparatus which is economical and compact and can be implemented in the limited space available in small circuit breakers.

SUMMARY OF THE INVENTION

These objects and others are satisfied by the invention which is directed to an arc fault detector, and a circuit breaker incorporating such an arc fault detector, having a current detector which includes an average instantaneous current generator which generates a running average of the instantaneous current. Averaging over the fundamental period of the ac current results in a signal that can be used to distinguish arcing faults over normal loads. The average over die fundamental period of a pure sine wave is ideally zero. The magnitude of the average current over the period of the fundamental is a function of the non-repeatability of the current waveform from half-cycle to half-cycle. This function produces greater outputs for current waveforms that vary from half-cycle to half-cycle in magnitude and pulse width. Arcing faults, being random in nature and having varying magnitudes, pulse widths and missing half-cycles, produce magnitudes greater than current waveforms of a consistent half-cycle to half-cycle nature for normal loads. The arc fault detector of the basic form of the invention includes a trip signal generator which generates a trip signal when die average instantaneous current reaches a threshold value.

As mentioned, die carbon arc can have a very consistent half-cycle to halfcycle current waveform, and therefore, it does not produce a sufficient magnitude of average current to distinguish it as an arc. Accordingly, a second embodiment of the invention incorporates additional features which ensure detection of the carbon arc. An approximation of the average instantaneous current over the fundamental period can be obtained with an analog bandpass filter having a center frequency which is below the fundamental frequency of the ac current. This approximation includes a fraction of the fundamental magnitude. Using this approximation, the carbon arc produces sufficient magnitudes to be effectively distinguished as an arc, while maintaining the increased sensitivity to random arcing and immunity to nuisance tripping. Tis also causes the output of the fundamental to no longer be zero. The threshold for this value can be set so that the carbon arc can be distinguished from the steady state dimmer current which will have a lower fundamental amplitude.

The arc fault detector must also be able to ignore inrush currents such as those associated with the motor start-up. Hence, in another embodiment of the invention, a di/dt or pulse detector is added to determine if a step increase in current has occurred within each half-cycle. In this embodiment, the trip signal generator responds only to a function of pulses generated in half-cycles in which the average instantaneous current is more than the threshold. Preferably, the trip signal generator generates the trip signal as a time attenuated accumulation of pulses in half-cycles in which the average instantaneous current is more than the threshold. This pulse generator can be implemented as a second bandpass filter having a center frequency above the fundamental frequency so that it generates a pulse in response to a step increase in the current. This bandpass filter can be set to trip at a desired pure 60 Hz current waveform by adjusting the level of 60 Hz in the di/dt bandpass filter. This serves as an electronic overcurrent detector. Thus, this circuit consists of two bandpass channels, one below the fundamental and one above the fundamental. The trip signal generator logically ANDs the output to these two bandpass filters.

To further improve sensitivity to arcs and to increase immunity to nuisance tripping, the pulse generator can be configured to generate an output as a function of a predetermined value of pulses generated each time an arc is struck. Preferably, this function is a time attenuated accumulation of the pulses. When a predetermined level of this time attenuated accumulation is reached, the pulse generator generates an output which enables the time attenuated accumulation of the average instantaneous current. If a sufficient average instantaneous current occurs, when enabled, a trip signal is generated.

The invention also includes incorporation of this novel arc fault detector in a circuit breaker which interrupts current in response to detection of an arc fault.

Accordingly, it is an object of the invention to provide an arc fault detector and a circuit breaker incorporating such an arc fault detector with improved sensitivity to arc faults, including carbon arc faults, and with enhanced immunity to nuisance trips, including response to dimmers and especially dimmers used to control tungsten bulbs.

It is also an object of the invention to provide such apparatus which monitors the average instantaneous current for use in detecting arc faults.

It is a further object of the invention to provide an enhanced version which combines monitoring of average instantaneous current with detection of step increases in current such as are produced each time an arc is struck.

It is an overall object of the invention to provide such apparatus which is economical and practical to implement.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
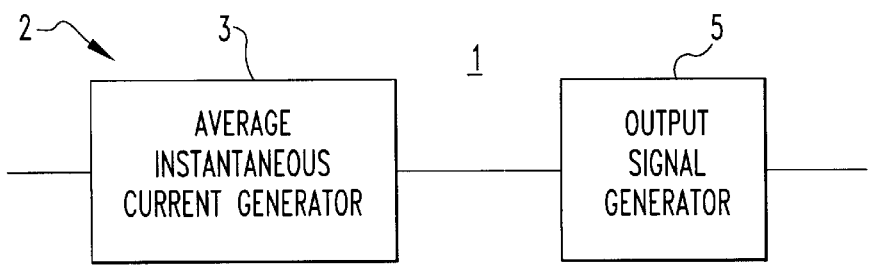
FIG. 1 is a schematic diagram in block form of the basic embodiment of the invention.

A basic concept upon which the arc fault detector of this invention is based is that the average of the instantaneous current over the interval of the fundamental of a sine wave is substantially zero, while due to their random nature, arcing faults in which half-cycles of the current have varying magnitudes, pulse widths and missing half-cycles will produce a value for the average instantaneous current over the period of the fundamental which will be greater in magnitude than that generated by the consistent half-cycle to half-cycle current waveforms typically drawn by normal loads. Thus, the arc fault detector 1 of FIG. 1 has a current detector 2 in the form of an average instantaneous current generator 3 which generates a running average of the instantaneous current over the period of the fundamental of the ac current. An arc fault signal generator 5 generates an arc detection signal when this average instantaneous current is above a threshold value. The average instantaneous current generator 3 can be implemented in a microprocessor which samples the current waveforms and generates a moving window which provides a running average of the instantaneous current.

Figure 3:
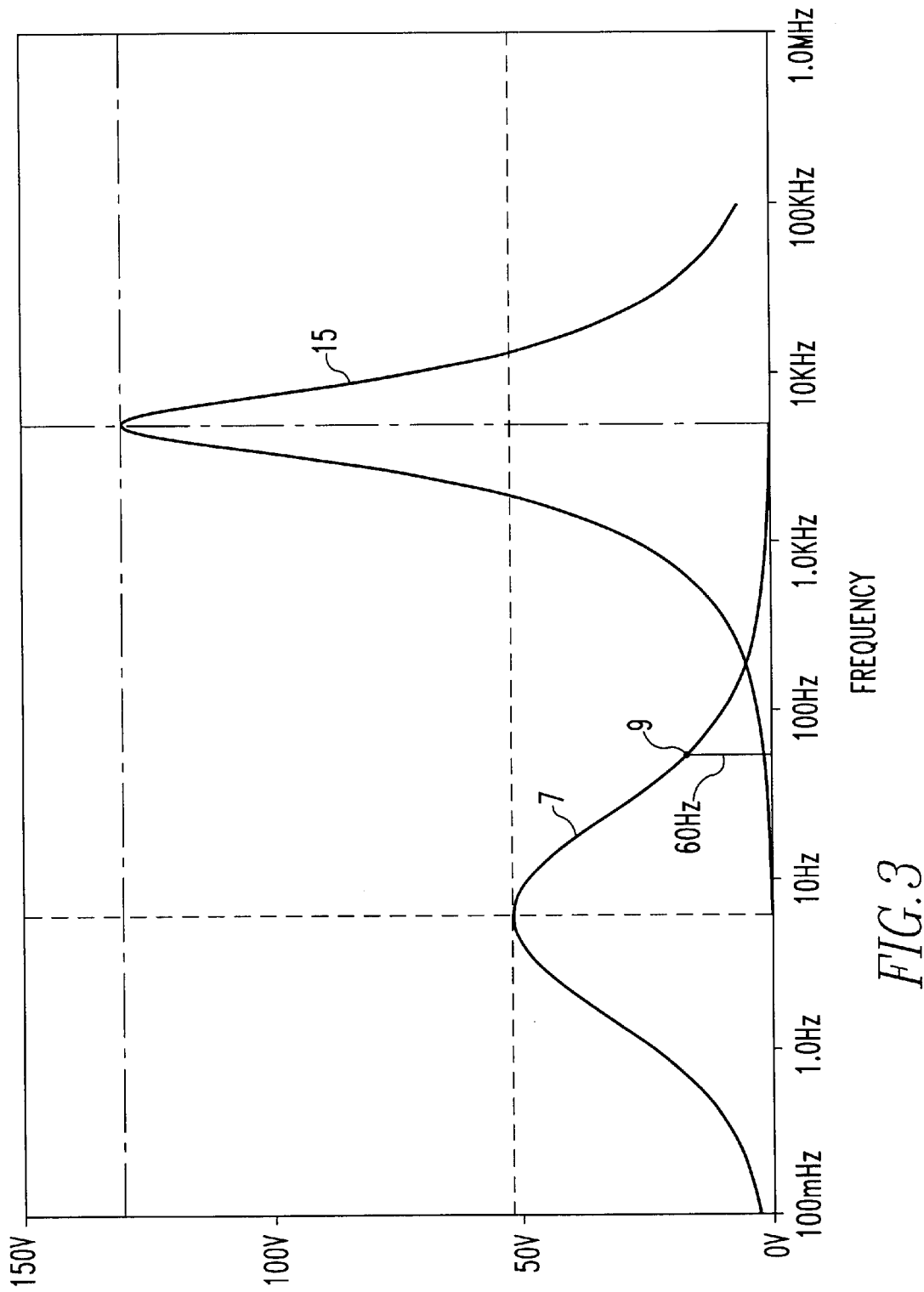
FIG. 3 is a graphical representation of the response of bandpass filters utilized in the embodiments of FIGS. 1 and 2.

The average instantaneous current generator can also be implemented in analog form by a bandpass filter having a center frequency below the fundamental frequency. For instance, as shown in FIG. 3, the bandpass filter for detecting arc faults in an ac system having a 60 Hz fundamental frequency can have a response 7 which is centered about 6 Hz. As mentioned, a carbon arc fault can produce a fairly regular pattern from half-cycle to half-cycle and therefore will not generate a large value for the average instantaneous current. Since a dimmer circuit, when phased back, also produces a rather uniform waveform from cycle to cycle, the response characteristic 7 of the bandpass filter is selected so that it includes a fraction of the fundamental as indicated at 9. As the carbon arc fault current will exceed the amplitude of the current drawn by a dimmer, the threshold of the output generator 5 can be selected to discriminate between the carbon arc fault and steady state dimmer circuit.

As is known, many loads draw inrush currents when turned on. For instance, a motor can draw 6 to 8 times its steady state current during start-up. As such inrush currents decay with time, they also produce an average instantaneous current which is non zero. In order to meet the requirement that an arc fault be detected within 8 half-cycles, additional measures are taken to differentiate arc faults from these inrush currents.

Figure 2:
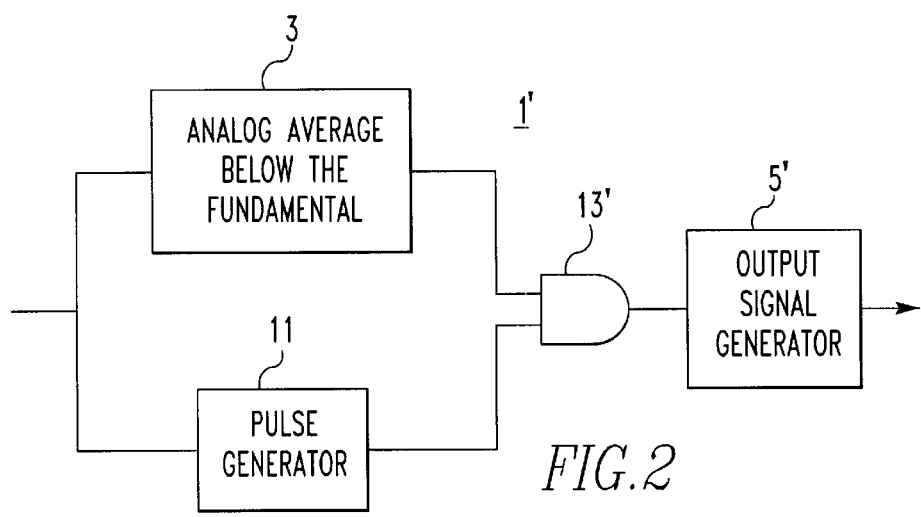
FIG. 2 is a schematic diagram in block form of a second embodiment of the invention.

FIG. 2 illustrates another embodiment of the arc fault detector 1' which, in addition to monitoring the average instantaneous current generated by the average instantaneous current generator 3, also looks for the step increases in current which occur each time an arc is struck. Thus, the current detector 2' of the arc fault detector 1' of FIG. 2 includes a pulse generator or di/dt detector 11 which generates a pulse each time an arc is struck. The outputs of the average instantaneous current generator 3 and the pulse detector 11 are logically ANDed at 13. The output generator 5' then generates an arc detection signal as a function of the value of the average instantaneous current at instants in half-cycles when a pulse is generated. Preferably, this function is a time attenuated accumulation.

Again, the embodiment of FIG. 2 can be implemented digitally in a microprocessor or with analog circuitry. In the latter case, the pulse generator 11 can be a second bandpass filter having a center frequency above the fundamental frequency. As an example, the response 15 of the bandpass filter forming the pulse generator 11 shown in FIG. 3, has a center frequency of about 10 KHz.

Figure 4:
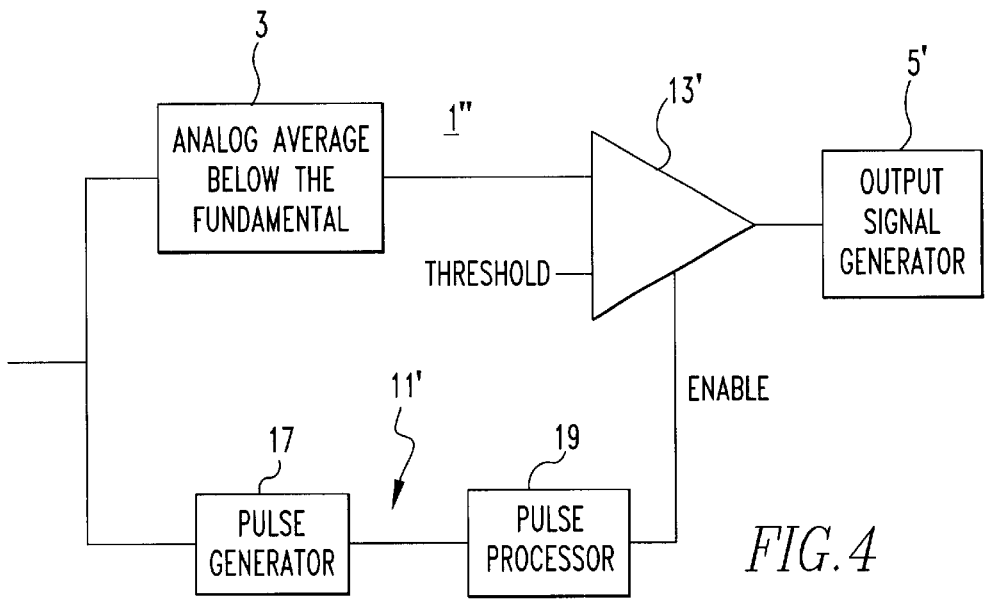
FIG. 4 is the schematic diagram in block form of yet another embodiment of the invention.

A tungsten filament has a very low resistance when cold, but its resistance increases rapidly as it beats up in response to current flow. Hence, if a dimmer is used to control a tungsten bulb, a current waveform is produced at bulb turn-on which exhibits a step increase during each half-cycle and an amplitude which decays from an initial very high value. This can make it necessary to reduce the sensitivity to carbon arc faults in order to avoid a nuisance trip. FIG. 4 illustrates another embodiment of die arc fault detector 1" which preserves the sensitivity to carbon arc faults while preventing nuisance trips attributable to turn-on of a tungsten bulb controlled by a dimmer. In this embodiment, die pulse generator 11' includes a di/dt detector 17 and, in addition, a pulse processor 19. In its preferred form, the pulse processor generates a time attenuated accumulation of pulses generated by the di/dt detector and produces an output when this accumulation reaches a predetermined level. The output of the pulse processor 19 is used to enable die output of the average instantaneous current generator 3. This enabling function is represented in FIG. 4 by an operational amplifier 13' which generates an output, if enabled by the pulse processor 19, when the average instantaneous current signal is above a threshold. As in the embodiment of FIG. 2, an output signal generator 5' generates an output as a function of the analog instantaneous average current when enabled. Preferably, the output is generated as a function of a time attenuated accumulation.

Figure 5:
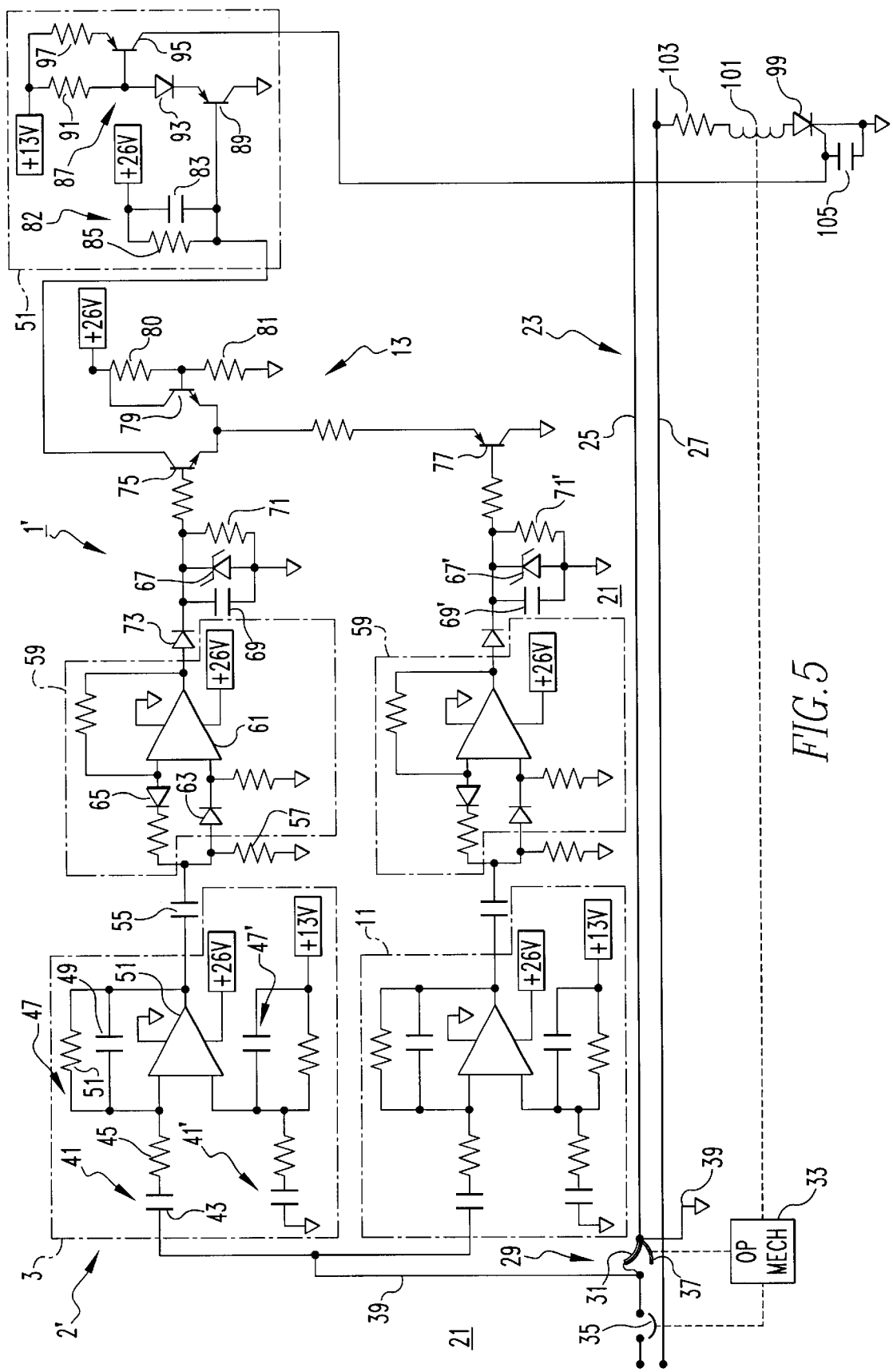
FIG. 5 is a schematic circuit diagram of the embodiment of the invention disclosed in FIG. 2.

FIG. 5 illustrates a circuit breaker 21 which incorporates an analog implementation of the arc fault detector 1' shown in FIG. 2. The circuit breaker 21 provides protection for an electrical circuit 23 which has a line conductor 25 and a neutral conductor 27. The circuit breaker 21 provides overcurrent and short circuit protection through a conventional thermal-magnetic trip mechanism 29 which includes a bimetal 31. As is well known, the bimetal 31 responds to persistent overcurrent conditions to actuate a spring-powered operating mechanism 33 to open a set of separable contacts 35 connected in series with the line conductor 25 to interrupt current flow in the electrical system 23. Short circuit protection is provided by a magnetic armature 37 which is magnetically attracted by the high short circuit current to also trip the operating mechanism 33 and open the separable contacts 35.

Arc fault protection is provided by the arc fault detector 1' which utilizes leads 39 connected across the bimetal 31 to sense current in the protected electrical system 23. As taught by U.S. Pat. No. 5,519,561, the voltage drop across the known resistance of the bimetal 31 provides a measure of the current flowing in the line conductor 25. The sensed current is applied to the average instantaneous current generator 3, which in this case is an analog bandpass filter having a center frequency below the fundamental frequency of the electrical system. This bandpass filter 3 includes a high-pass filter 41 formed by the series-connected capacitor 43 and the resistor 45, followed by a low-pass filter 47 formed by the parallel-connected capacitor 49 and the resistor 51. The bandpass filter 3 provides an approximation of the average instantaneous current over the period of the fundamental. As discussed in connection with FIG. 2, the response curve 7 of this bandpass filter 3 can have a center frequency of about 6 Hz and includes some 60 Hz as shown at 9 in FIG. 3 for, as explained, discriminating carbon arc faults over dimmer circuits.

An operational amplifier (op amp) 53 provides gain for the average instantaneous current signal. The op amp 53 is biased at its non-inverting input by a 13 vdc supply voltage. Complementary highpass filter 41' and low-pass filter 47' delay application of the bias to prevent generation of false trip signals during power-up.

The average instantaneous current signal rides on a +13 vdc volt bias supplied to the op amp 53. This bias is removed by the ac coupling capacitor 55 which, along with the resistor 57, forms another highpass filter stage. The bipolar average instantaneous current signal resulting is rectified by a rectifier circuit 59 which includes another op amp 61. Positive values of the bipolar average instantaneous current signal are applied to the non-inverting input of the op amp 61 through the diode 63, while negative values are applied to the inverting input through the diode 65. The output of the op-amp 61 is an average instantaneous current signal having a single polarity.

The amplitude of the average instantaneous current signal output by the rectifier circuit 59 is limited by a zener diode 67. In addition, a capacitor 69, shunted by a bleed resistor 71, serves as a peak detector of the average instantaneous current signal. A diode 73 prevents discharge of the capacitor 69 through the rectifier 59.

The sensed current signal taken across the bimetal 31 is also applied to the pulse generator 11. The pulse generator 11 is implemented by analog circuitry similar to that of the average instantaneous current generator 3, except that the parameters are selected such that the bandpass filter of the pulse generator 11 has a center frequency above the fundamental frequency of the electrical system, and in the exemplary embodiment has a center frequency of about 5 kHz and a response such as that shown by the curve 9 in FIG. 3. The result is that the pulse generator 11 outputs a pulse in response to each step increase in current in the line conductor 25 produced when an arc is struck. This pulse signal is passed through a rectifier circuit 59 to produce a pulse signal of a single polarity. Again the pulses are limited in amplitude by a zener diode 67'. In the case of this pulse signal, the capacitor 69' and resistor 71' stretch the pulses to produce pulses of generally uniform width.

The average instantaneous current signal and the pulse signal, as rectified and conditioned, are logically ANDed by the logic 13 which includes transistors 75 and 77 connected in series. An additional transistor 79 forms a differential pair with the transistor 75 and, together with the resistors 80 and 81, sets the threshold for the average instantaneous current signal necessary to turn the transistor 75 on. Output circuit, or trip signal generator, 5' includes a circuit 82 which generates a time-attenuated accumulation of pulses generated in half-cycles when die average instantaneous current is above the selected threshold. The pulses are accumulated on a capacitor 83 connected to the 26 vdc supply. A bleed resistor 85 connected across the capacitor 83 provides time attenuation. Pulses are applied to the capacitor 83 only when both the transistors 75 and 77 are on. When no pulses are applied, both electrodes of the capacitor 83 are at 26 volts. When the transistors 75 and 77 are on, charge is applied to the capacitor 83. The successive pulses are accumulated through integration of the charge they add to the capacitor 83. The resistor 85 continuously bleeds tie charge on the capacitor 83 with a time constant determined by the values of the capacitor 83 and the resistor 85 to time-attenuate the accumulation of the pulses. It can be appreciated that the magnitude and the time interval between die pulses and the magnitude of the instantaneous average current determine the instantaneous voltage that appears across the capacitor 83.

A circuit 87 monitors the voltage across the capacitor 83 representing the time attenuated accumulation of the pulses generated when the average instantaneous current signal was above the threshold. Each pulse lowers the voltage on the capacitor which is applied to the base of a transistor 89. A voltage is applied to the emitter of the transistor 89 by the 13 vdc supply through a resistor 91 and a diode 93. With no pulses being generated, the voltage on the base of the transistor 89 is 26 volts. Without the diode 93, the 13 volt reverse bias would destroy the base to emitterjunction of the transistor 89. The diode 93 withstands this voltage. When the voltage at the lower end of the capacitor 83, and therefor on the base of the transistor 89, falls below the 13 volt minus the forward drop across the diode 93, the transistor 89 is turned on. Turn-on of the transistor 89 provides base drive for a transistor 95 which draws current limited by the resistor 97 to generate an arc fault trip signal which turns on a silicon controlled rectifier (SCR) 99. Turn-on of the SCR 99 energizes a trip solenoid 101 which draws current limited by resistor 103 from the neutral conductor 27. Energization of the trip solenoid 101 actuates the operating mechanism 33 to open the separable contacts 35 and thereby interrupt the arc current. A capacitor 105 protects the gate of the SCR from transients and prevents tripping on spurious signals.

Figure 6:
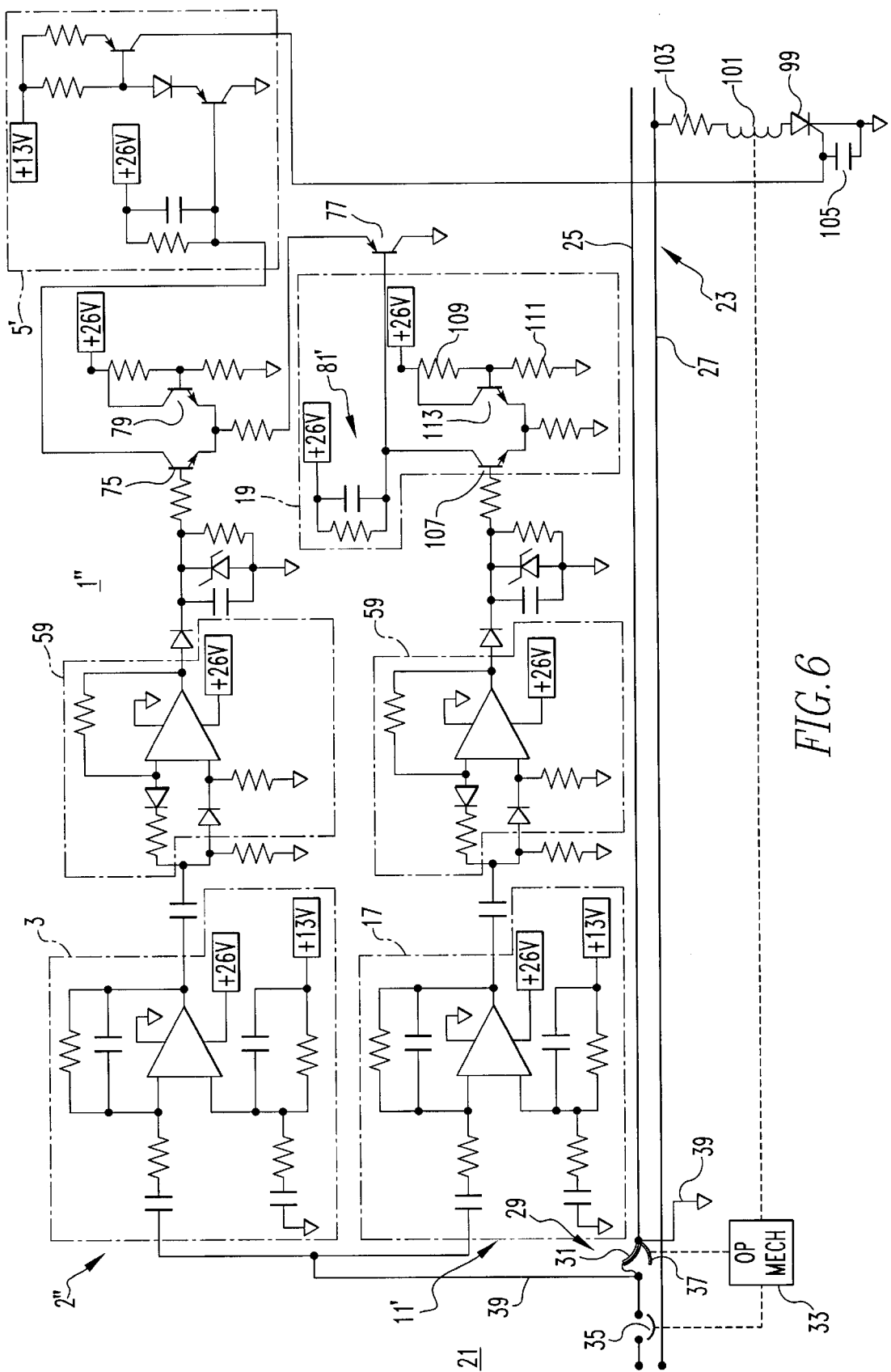
FIG. 6 is a schematic circuit diagram of the embodiment of the invention shown in FIG. 4.

FIG. 6 illustrates an analog implementation of tie embodiment of the arc fault detector 1" of FIG. 4 incorporated into a circuit breaker 21'. This circuit is similar to the circuit of FIG. 5, except that the pulse generator 11' in addition to including a circuit 17 for generating a pulse each time an arc is struck, also includes the pulse conditioner 19 which generates a pulse generator output signal controlling turnon of the transistor 77 of the and logic 13. This circuit 19 generates an output which is a function of the pulses generated by the circuit 17. Preferably, the function is a time-attenuated accumulation of those pulses. The time-attenuated accumulation is implemented by the circuit 81', which is similar to the circuit 81. The pulses are applied to this circuit 81' by turn-on of the transistor 107, which in turn is controlled by the threshold set by the resistors 109 and 111 and applied through the differential amplifier arrangement which includes the transistor 113. The circuit 19 does not permit turn-on of the transistor 77 until the selected time-attenuated accumulation of pulses generated by the circuit 17 has reached a selected level. This, in effect, delays initiation of the current attenuated accumulation by the circuit 81. This arrangement is effective in providing increased sensitivity to arcing faults and, in particular, to carbon arcing faults, without false tripping by the initially large amplitude step increases produced by a dimmer during turn-on of a cold tungsten bulb.

While specific embodiments of the invention have been described in detail, it will be appreciated by those skilled in die art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An arc fault detector for an ac electrical system having a fundamental frequency and subject to arc faults generating step increases in an instantaneous value of current each time an arc is struck, comprising:
   a current detector comprising an average instantaneous current generator generating a running average of said instantaneous value of current; and
   an output signal generator generating an arc fault signal as a function of said running average instantaneous current in excess of a threshold.

2. The arc fault detector of claim 1 wherein said current detector further includes a pulse generator generating a pulse in response to a step increase in current each time an arc is struck and said output signal generator generates said arc fault signal as a function of pulses generated in half-cycles in which said average instantaneous current is more than said threshold.

3. The arc fault detector of claim 2 wherein said output signal generator generates said arc fault signal as a time attenuated accumulation of said pulses in half-cycles in which said average instantaneous current is more than said threshold.

4. The arc fault detector of claim 3 wherein said average instantaneous current generator comprises a first bandpass filter having a first center frequency less than said fundamental frequency and wherein said pulse generator comprises a second bandpass filter having a second center frequency more than said fundamental frequency.

5. The arc fault detector of claim 1 wherein said current detector further includes a pulse generator generating a pulse generator output as a function of a predetermined value of pulses generated each time an arc is struck, and said output signal generator generates said arc fault signal as a function of said pulse generator output and said average instantaneous current which is more than said threshold.

6. The arc fault detector of claim 5 wherein said pulse generator generates said pulse generator output as a time attenuated accumulation of said pulses.

7. The arc fault detector of claim 6 wherein said output signal generator generates said arc fault signal as a time attenuated accumulation of said average instantaneous current and said pulse generator output.

8. The arc fault detector of claim 7 wherein said average current generator comprises a first bandpass filter having a first center frequency less than said fundamental frequency and said pulse generator includes a second bandpass filter having a second center frequency more than said fundamental frequency.

9. The arc fault detector of claim 1 wherein said average instantaneous current generator comprises a first bandpass filter having a first center frequency less than said fundamental frequency generating said running average of instantaneous current.

10. The arc fault detector of claim 9 wherein said current detector further includes a second bandpass filter generating pulses and said output signal generator generates an arc fault signal as a function of pulses generated when said average of said instantaneous current is more than said threshold.

11. The arc fault detector of claim 9 wherein said current detector further includes a pulse generator comprising a second bandpass filter with a second center frequency more than said fundamental frequency generating a pulse in response to a step increase in current each time an arc is struck, and a pulse processor generating a pulse generator output as a function of pulses generated by said second bandpass filter, and said output signal generator generates said arc fault signal as a function of said pulse generator output and said running average of said instantaneous current more than said threshold.

12. The arc fault detector of claim 9 wherein said first bandpass filter includes a portion of said fundamental frequency in said average of said instantaneous current.

13. A circuit breaker for interrupting current in an ac electrical system having a fundamental frequency and subject to arc faults generating step increases in an instantaneous value of said current each time an arc is struck, comprising:

separable contacts;
  an operating mechanism opening said separable contacts in response to a trip signal; and
  an arc fault detector comprising:
    a current detector comprising an average instantaneous current generator generating a running average of said instantaneous current; and
    trip signal generator generating a trip signal as a function of said running average of said instantaneous current in excess of a threshold.

14. The circuit breaker of claim 13 wherein said average instantaneous current generator comprises a first bandpass filter having a first center frequency less than said fundamental frequency generating said running average of instantaneous current.

15. The circuit breaker of claim 14 wherein said current detector further includes a second bandpass filter generating pulses and said trip signal generator generates a trip signal as a function of pulses generated when said average of said instantaneous current is more than said threshold.

16. The circuit breaker of claim 15 wherein said trip signal generator generates said trip signal as a time attenuated accumulation of said pulses and half-cycles in which said average instantaneous current is more than said threshold.

17. The circuit breaker of claim 16 wherein said first bandpass filter passes a portion of said fundamental frequency in said average of said instantaneous current.

18. The circuit breaker of claim 14 wherein said current detector further includes a pulse generator comprising a second bandpass filter with a second center frequency more than said fundamental frequency generating a pulse in response to a step increase in current each time an arc is struck, and a pulse processor generator generating a pulse generator output as a function of pulses generated by said second bandpass filter, and said trip means generates said trip signal as a function of said pulse generator output and said running average of said instantaneous current more than said threshold.

19. The circuit breaker of claim 18 wherein said pulse processor generates said pulse generator output as a time attenuated accumulation of said pulses.

20. The circuit breaker of claim 19 wherein said trip signal generator generates said trip signal as a time attenuated accumulation of said average instantaneous current and said pulse generator output.

21. The circuit breaker of claim 20 wherein said first bandpass filter passes a portion of said fundamental frequency in said average of said instantaneous current.

* * * * *